United States Patent [19]

Crow et al.

[11] 4,034,173
[45] July 5, 1977

[54] CENTRIFUGAL ACTUATED ELECTRIC MOTOR SWITCH STRUCTURE

[75] Inventors: William D. Crow; Thomas V. Ottersbach; Eugene F. Hildebrandt, all of St. Louis, Mo.

[73] Assignee: Emerson Electric Co., St. Louis, Mo.

[22] Filed: June 18, 1975

[21] Appl. No.: 587,822

[52] U.S. Cl. .............................. 200/80 R; 200/246
[51] Int. Cl.² ................... H01H 35/10; H01H 1/28
[58] Field of Search ......... 200/1 R, 1 A, 5 R, 6 BB, 200/6 C, 80 R, 80 A, 80 B, 246, 283, 164 R, 67 D, 67 E, 67 PK, 68, 247

[56] References Cited

UNITED STATES PATENTS

| | | | |
|---|---|---|---|
| 2,898,417 | 8/1959 | Wieczorek | 200/80 R |
| 2,910,551 | 10/1959 | Laviana | 200/246 X |
| 3,018,353 | 1/1962 | Mitchell | 200/247 |
| 3,185,788 | 5/1965 | Zollmann, Jr. | 200/80 R |
| 3,433,908 | 3/1969 | Cunningham | 200/80 R |

*Primary Examiner*—James R. Scott
*Attorney, Agent, or Firm*—Polster and Polster

[57] ABSTRACT

A starting switch assembly is integrally formed with a terminal connection board and is adapted to be actuated by a conventional centrifugal actuator. The switch assembly is constructed so that the electrical contact points of the assembly abut one another under a predetermined pressure independent of the forces exerted on other structural components of the assembly. In the preferred embodiment, the terminal connection board is used to connect external power leads to the dynamoelectric machine. The switch assembly includes a terminal block integrally formed with the terminal connection board. Various windings of the dynamoelectric machine are connected to the power leads by switch assembly operation. The assembly includes a switch arm which is mounted for movement between at least first and second positions. The switch arm is designed to engage and disengage respective ones of a plurality of electrical contacts as the switch arm moves between positions. The switch assembly also includes provisions for some lost motion movement before switch operation in each direction of switch arm movement.

15 Claims, 11 Drawing Figures

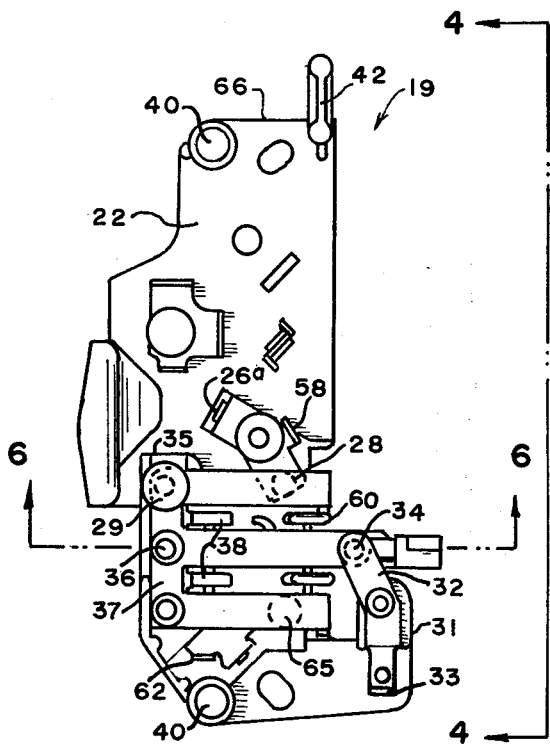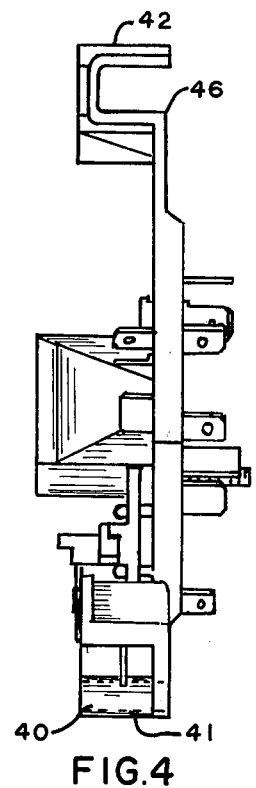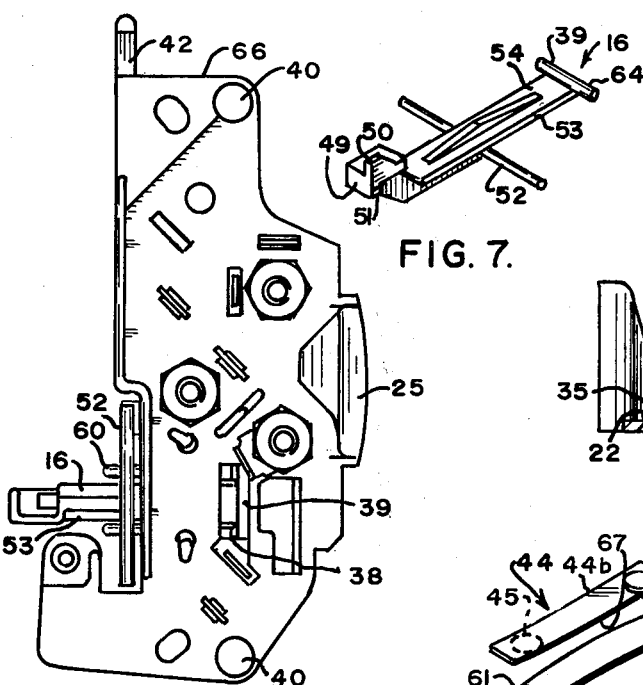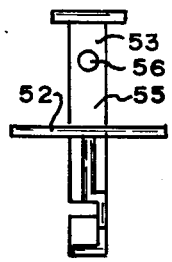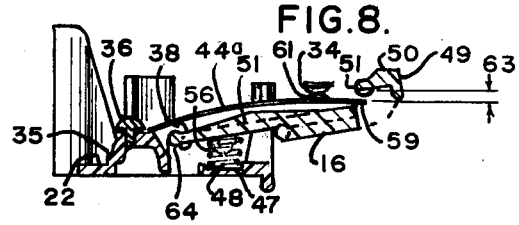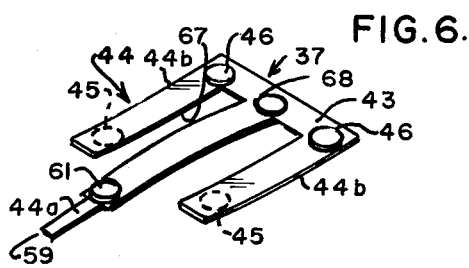

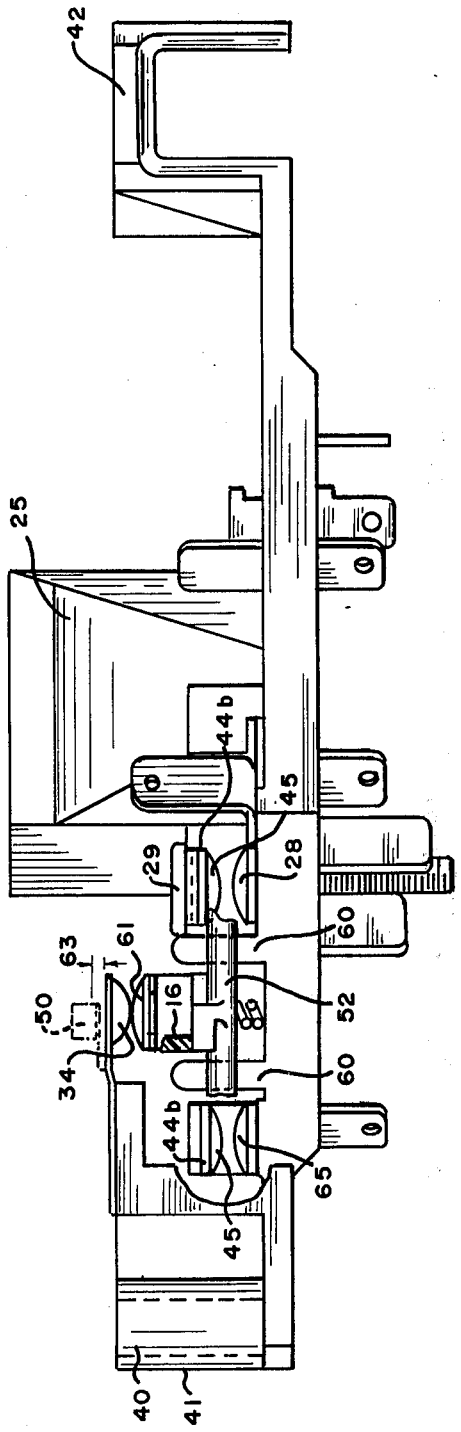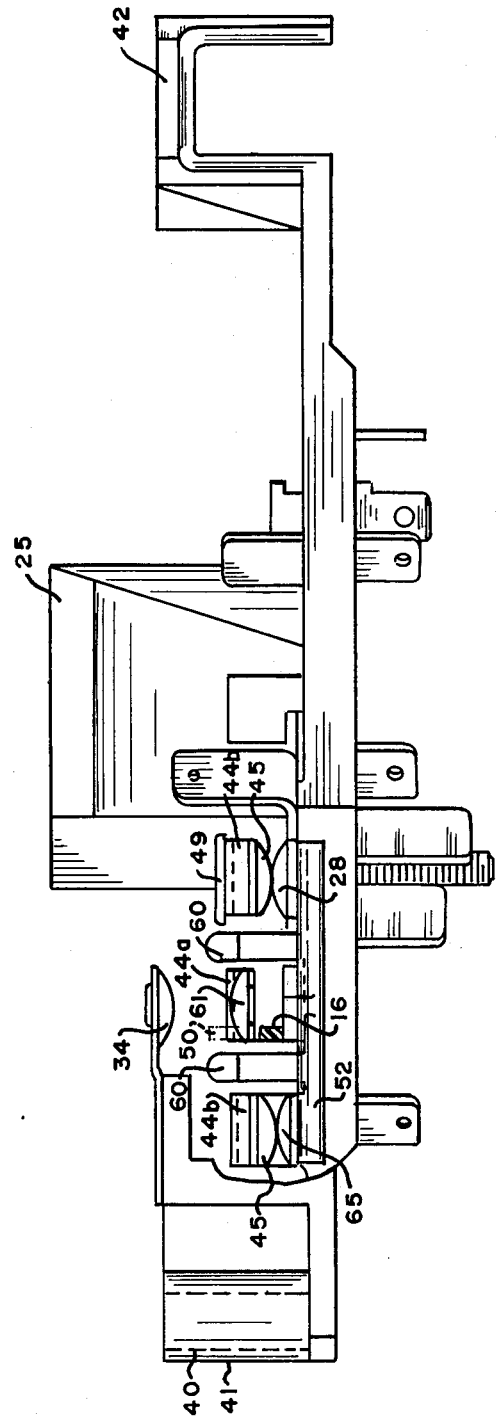

CENTRIFUGAL ACTUATED ELECTRIC MOTOR SWITCH STRUCTURE

BACKGROUND OF THE INVENTION

This invention relates to switch assemblies and, in particular, to switch assemblies utilized in conjunction with conventional centrifugal actuators in dynamoelectric machines.

A variety of dynamoelectric machines, for example, capacitor start and split phase induction motors, utilize a first winding combination for the starting condition of motor operation, and a second winding combination for the run condition of motor operation. These motors commonly include a stator assembly having a central, axially extending bore opening and a rotor assembly mounted for rotation with respect to the stator assembly, carried in the bore opening. The stator assembly includes a core constructed from a plurality of individual laminations formed from a suitable magnetic material. Each lamination, in addition to the bore opening, has a plurality of radially extending slots opening onto the bore along one end of the slots. The motor winding conventionally is disposed in the aligned slots of the lamination plurality in some predetermined manner.

As indicated, the bore opening is intended to receive the rotor assembly. The rotor assembly preferably includes a squirrel cage rotor, for example, and a shaft mounted for rotation along suitable bearing means conventionally housed in each one of a pair of end shields. The end shields commonly either are attached to the stator assembly, or to a shell enclosing the stator assembly. A centrifugal actuator usually is mounted to the shaft and rotates with it. The centrifugal actuator is intended to engage a switch arm which in turn operates a switch mechanism for connecting or disconnecting a source of electrical energy to various motor winding circuit configurations as motor speed varies. In the split phase motor illustratively discussed above, it is conventional to remove an auxiliary or start winding from the motor electrical circuit as the motor nears running speed. After removal of the start winding, the motor operates on a run or main winding unless motor speed decreases to the point where the actuator re-engages the switch arm to connect the start winding back into the motor circuit.

A number of switch assemblies are known in the prior art. One prevalent design includes a switch and switch enclosure which is mounted externally of the motor. For example, the switch assembly usually is mounted to one of the motor end shields. This particular design has a separate switch arm placed through the end shield which engages the centrifugal actuator in at least one of the actuator positions. While these prior art devices work well for their intended purposes, they generally are characterized by expensive construction techniques. For example, in the prevalent design described, means for mounting the switch assembly to the end shield is required. Means for inserting the switch arm through the end shield also is necessary. In addition, because the switch assembly is mounted on the outside of the motor enclosure, the various motor leads are exposed both to environmental conditions and unauthorized personnel.

Switch assemblies which are mounted internally of the end shields also are known in the art. As a class, they generally are relatively expensive if desirable features, such as lost motion movement later described, is provided.

Our invention eliminates these prior art deficiencies in that a simple, low cost device is provided which may be mounted internally of the motor end shields. The device functions both as a terminal board connection device and a switch assembly. Switch assembly operation is controlled by a conventional centrifugal actuator. Access to the terminal board may be made through the end shield after removal of a common, low cost cover plate. The switch assembly construction is designed to provide lost motion movement in at least one direction of switch assembly operation. The provision of lost motion movement means that false engagement of the various connections made through the switch assembly may be eliminated or reduced with out switch design. In addition, contact pressure in conventional switch designs often is dependent on the position of the switch arm. If the switch arm for some reason does not clear the centrifugal actuator during operation, the contact pressure is reduced or non-existent. Reduced contact pressure, in turn, can have adverse affects on motor life. Our design eliminates the interrelation of contact pressure and switch arm position prevalent in prior art switch assembly designs. The switch assembly of our invention includes at least one movable arm which is pre-shaped so as to bias the arm, and its associated contact point, into engagement with a fixed contact carried by a non-movable portion of the switch assembly.

One of the objects of this invention is to provide a low cost switch device for a dynamoelectric machine.

Another object of this invention is to provide a switch assembly having contact pressure independent of switch arm position.

Another object of this invention is to provide a switch assembly which may be mounted internally of the motor end shield.

Another object of this invention is to provide a switch assembly which is integrally formed with a terminal board structure.

Another object of this invention is to provide a simplified switch structure.

Other objects of this invention will be apparent to those skilled in the art in light of the following description and accompanying drawings.

SUMMARY OF THE INVENTION

In accordance with this invention, generally stated, a starting switch is provided having a plurality of movably electrially conductive members carrying first electrical contacts. The conductive members are biased towards engagement with a plurality of fixed second electrical contacts. A switch arm is pivotally mounted to a support block. The support block also has a first end of the electrically conductive members attached to it. The second end of the electrically conductive member are free and have individual ones of first electrical contacts attached to their free ends. The switch arm is adapted to engage the free end of the conductive members as the switch arm moves between first and second positions, thereby opening or closing various ones of the first and second electrical contacts of the switch assembly. The switch arm is designed to permit some lost motion movement with respect to at least one pair of first and second electrical contacts before switch operation is affected. In the preferred embodiment, the switch assembly is mounted to a terminal board structure, and normally is not accessible to unauthorized personnel. The electrically conductive members are biased so that the contact pressure between the first and second electrical contacts is independent of the position of the switch arm of the switch assembly.

BRIEF DESCRIPTION OF THE DRAWINGS

In the drawings.

FIG. 3 is a top plan view of the terminal board shown in FIG. 2, showing the switch assembly of this invention;

FIG. 4 is a view taken along the line 4—4 of FIG. 3;

FIG. 5 is a bottom plan view of the terminal board and switch assembly shown in FIG. 2;

FIG. 6 is a sectional view taken along the line 6—6 of FIG. 3;

FIG. 7 is a view in perspective of a switch arm used in conjunction with the switch assembly of this invention;

FIG. 8 is a bottom plan view of the switch arm shown in FIG. 7;

FIG. 9 is a view in perspective of an electrically conductive member or conductive means used in conjunction with the switch assembly of FIG. 2;

FIG. 10 is an enlarged view, corresponding to FIG. 4, and partly broken away to illustrate one position of the switch of this invention; and FIG. 11 is an enlarged view, corresponding to FIG. 4, and partly broken away to illustrate a second position of the switch of this invention.

DESCRIPTION OF THE PREFERRED EMBODIMENT

Figure 1:
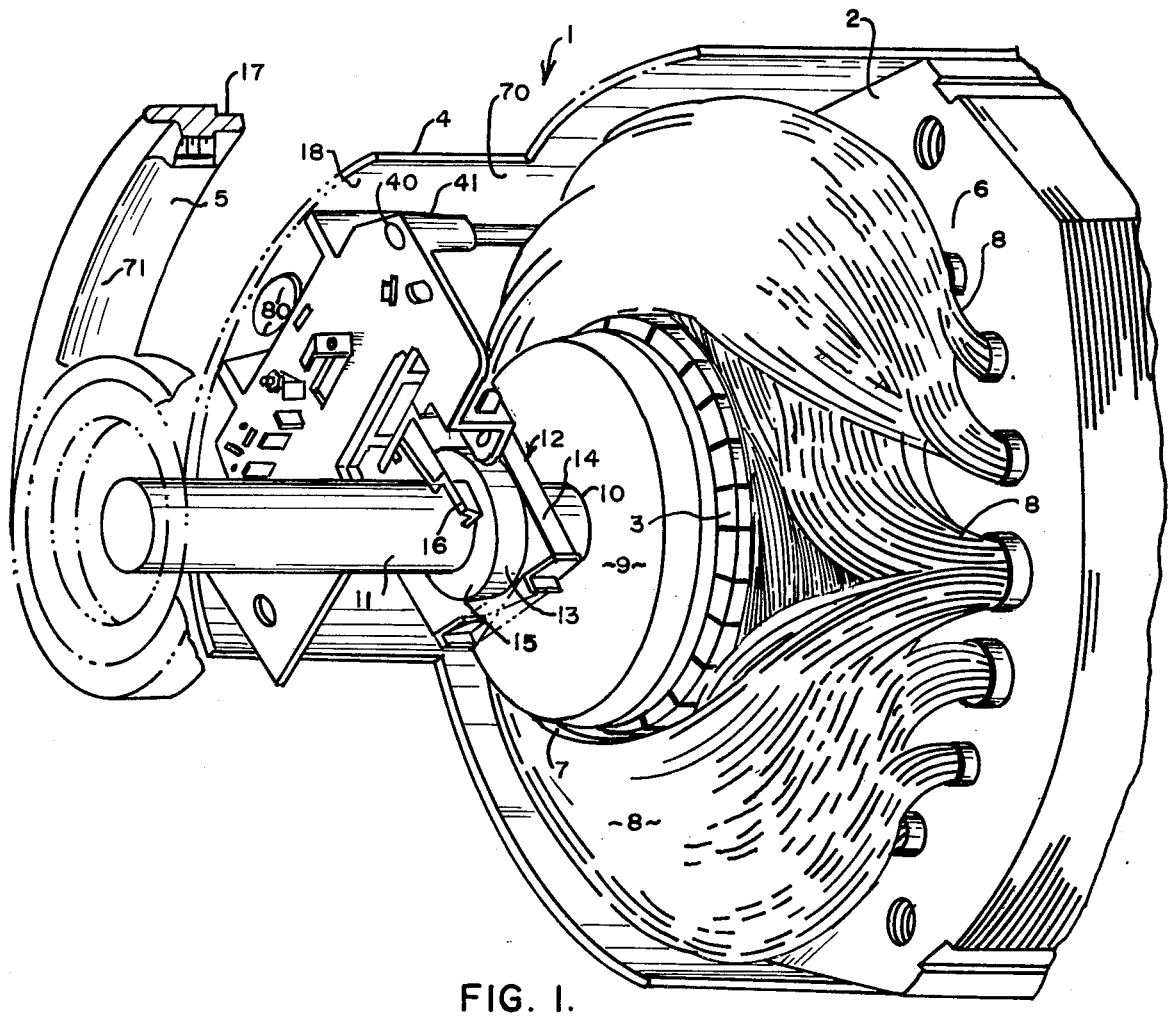
FIG. 1 is an exploded view in perspective, partly broken away, illustrating the switch assembly of this invention positioned in a conventional dynamoelectric machine.

Referring now to FIG. 1, reference numeral 1 generally refers to one illustrative embodiment of a motor with which our invention finds application. The motor 1 includes a stator assembly 2 and a rotor assembly 3 which are housed in a shell 4. The shell 4 is closed, at each end, by a pair of end shields 5, only one of which is shown in the drawings.

The motor 1 is conventional, and may comprise any of a variety of commercially available dynamoelectric machines. In general, the stator assembly 2 of the motor 1 includes a core assembly 6 constructed from a plurality of individual laminations formed from magnetic material. Each of the laminations has a central opening in it, and a plurality of slots extending radially outwardly from the central opening. When aligned, the central opening defines a bore 7 and the slots define a plurality of longitudinally extending winding receiving receptacles. A winding 8 is inserted in the receptacles of the core assembly. Winding 8 conventionally is constructed from magnet wire. Those skilled in the art will recognize that the term "magnet wire" refers to a suitable metallic wire having an electrically insulative film attached to it. The winding 8 may be, and preferably is, a distributed winding arranged in the various slots of the core assembly 6 according to a predetermined distribution pattern.

The rotor assembly 3 includes a rotor 9 having a central opening 10 through it, designed to permit the insertion of a shaft 11. The rotor 9 also conventionally is a squirrel cage design constructed from a plurality of laminations aligned to form a core for the rotor, each lamination having a plurality of slots punched near the lamination periphery for receiving the rotor bar conductors. Conventionally, conductor bars and end rings of the rotor assembly are die cast from aluminum, for example.

The shaft 11 is journaled for rotation along each of the end shields 5 by common bearing devices, not shown. The shaft 11 extends through at least one of the end shields 5 and functions to convert the motor 1 electrical energy input to a mechanical output. The shell 4 and end shields 5 delineate an enclosure for the motor 1, which enclosure in turn defines a chamber 70.

A centrifugal actuator 12 is mounted to the shaft 11, with the chamber 70. The actuator 12 rotates with the shaft 11. The actuator 12 includes a collar 13. Collar 13 is annular in plan, having a central opening for permitting the collar 13 to fit over the shaft 11 and to move axially with respect to the shaft 11 as centrifugal forces draw a mechanism 14 radially outwardly during rotation of the rotor 9. The collar 13 has a face 15 which is adapted to abut a switch arm 16 in all non-rotating positions of the rotor 3. Switch arm 16 is described in more detail hereinafter.

The shell 4 generally is a cylindrical section of sufficient length to house the stator and rotor assembly. The shell 4 may be crimped or otherwise fitted to the outer diameter of the stator assembly 2. The end shields 5 also may comprise a variety of designs. While an important consideration in motor manufacturing, the design of the end shields 5 generally is not a factor in our invention, and consequently, they are not described in detail. It should be noted, however, that various end shield designs often have an open area 71 which gives access to a terminal board 19, when the terminal board is positioned inboard of the end shield. A conventional cover plate, not shown, may be utilized to close the area 71, if desired. It also is conventional to provide a lip 17 in the end shield 5 structure. Lip 17 functions to receive the ends of the shell 4. As indicated, when the shell 4 and the end shields 5 are mounted to one another, they define the chamber 70. It is conventional to insert stator bolts through the end shields 5, and corresponding openings in the stator 2 from one side of the motor 1 to the other. The bolts are secured by any convenient means. Conventional threaded fasteners work well, for example.

The terminal board 19 is mounted within the chamber 70. Terminal board 19 includes a first face 21, a second face 22, a lower edge 23, and an upper edge 24. The edge 24 has a lead guide means 25 integrally formed in it. The lead guide means 25 functions to direct input terminal leads from an opening 80 in the shell assembly 4 to the face 21 side of the terminal board 19. A more particular discussion of both the function and the structure of the lead guide means 25 is contained in a co-pending application by Crow et al, Ser. No. 587,971 filed June 18, 1975. Details of the lead guide means 25 structure not forming a part of this invention may be found in the Crow et al application.

The face 21 has a plurality of male quick connect terminals 26 extending through suitable openings 27 between the surface 21 and 22. The embodiment of the terminal board 19 shown in the drawings also has a number of additional openings 27 which may be utilized or not, depending upon particular applicational requirements. That is to say, a pattern if the openings 27 may be formed between the faces 21 and 22, particular ones of the opening pattern being utilized or not utilized in response to applicational demands.

A quick connect terminal 26a, extending outwardly from the face 21 side of the terminal board 19, is electrically connected to a contact 28 on the face 22 side of the terminal board 19, shown in phantom lines in FIG. 3. A terminal 26b, extending outwardly from the face 21 side of the terminal board 19, is electrically connected to a contact point 29 on the face 22 side of the terminal board 19. A terminal 26c, extending outwardly from the face 21 side of the terminal board 19, is electrically connected to a contact 65 on the face 22 side of terminal board 19, shown in phantom lines in FIG. 3.

The face 22 of the terminal board 19 has a support means 31 integrally formed with it, which extends upwardly from the plane of the face 22, upwardly being referenced to FIG. 3. Support means 31 has an electrically conductive means 32 attached to it. The means 32 includes a quick connect terminal 33 and a contact 34 shown in phantom lines in FIG. 3. The quick connect terminal 33 is laterally displaced from the plane of the face 22 for a distance sufficient to permit the interconnection of a convention quick connect terminal for example, without physical interference due to the proximity of the face 22.

The terminal board 19 has a pair of openings 40 through it, for receiving the bolts inserted through the motor assembly 2. Inserting the stator bolts through the terminal board 19 enables the board to be positioned easily within the chamber 70. The openings 40 may have extensions 41 integrally formed with the bracket 19, extending perpendicularly outwardly on the face 22 side of the bracket 19. The extensions 41, in addition to their bolt receiving function, also provide structural rigidity to the terminal board 19. The terminal board 19 has a lead attachment means 42 extending outwardly from a side edge 66. The lead attachment means 42 is utilized to engage motor leads, not shown, as more fully described in the above-referenced co-pending application, Crow et al, Ser. No. 587,971, filed June 18, 1975. Details of the lead attachment means 42, not forming a portion of the invention disclosed herein, may be obtained from the Crow et al co-pending application.

The face 22 of the terminal board 19 has a receptable 47 formed in it, which is intended to seat a spring 48 in a conventional manner, as is best seen in FIG. 6.

A support block 35 of a switch assembly 80 also is integrally formed with the terminal board 19, extending upwardly from the plane of the face 22. The switch assembly 80 includes the support block 35, the switch arm 16, and a conductive member or conductive means 37.

The support block 35 has an opening through it for receiving the contact point 29 which, in the embodiment illustrated, is a conventional electrically conductive threaded fastener having an enlarged head on the face 22 side of the terminal board 19. A plurality of stubs 36 extend upwardly from and are integrally formed with the block 35. The stubs 36 are sized to receive the electrically conductive member 37. The stubs 36 are coined over or otherwise deformed to attach the electrically conductive member 37 to the support block 35. The support block 35 also includes a pair of integrally formed hooks 38 having an open mouth directed toward the face 21 side of the bracket 19. The hooks 38 are designed to receive an end 39 of the switch arm 16.

Conductive means 37, best seen in FIG. 9, is a metallic structure, preferably constructed from copper or similar material, which includes a base 43 having a plurality of conductive members 44 extending outwardly from the base 43. The members 44, in the embodiment illustrated, have an elongated central member 44a and a pair of members 44b outboard of the central member 44a. The member 44a is bent from the plane of the base 43 so as to bias the member 44a upwardly from the base 43, upwardly being referenced to FIG. 9. Each of the members 44b, however, are bent from the plane of the base 43 so as to bias the members 44b downwardly from the base 43, downwardly again being referenced to FIG. 9. The bias provided by the construction of the members 44a and 44b is important, as is explained in greater detail hereinafter. Each of the members 44b has a contact 45 mounted along a side 67 of the conductive means 37, while the member 44a has a contact 61 mounted along a side 68 of means 37. Contacts 45 and 61 are conventional and may comprise a variety of commercially available devices attached to the members 44 by any convenient method. The base 43 of the means 37 has a plurality of openings 46 through it, which are designed to receive the stubs 36 and the contact point 29, thereby mounting the conductive member 37 to the support block 35.

The switch arm 16, shown separately in FIGS. 7 and 8, includes a body part 53 terminated at one extremity by the end 39, end 39 being T-shaped in plan. Body part 53 has a first side 54 and a second side 55. The side 55 has a projection 56 formed in it. The projection 56 is intended to receive and seat an end of the spring 48. As may be observed in the drawings, an arm 64 defining the T-shape of the end 39 is inserted into the hooks 38. When so positioned, the spring 48 exerts a force against the switch arm 16 which locks the end 39 within the hooks 38, but which permits pivotal movement of the switch arm 16 against the force of the spring.

An end 49 of the switch arm 16 has an actuator 12 abutting projection 50 formed on the side 54 of the arm 16, and a member 44 engaging surface 51 formed in the side 55 of the arm. A cross bar 52 extends perpendicularly outwardly from the body part 53 of the switch arm 16, along the side 55 of the body part.

The terminal board 19 has a pair of stops 60 intergally formed with it, on the face 22 side of the board. The stops 60 are L-shaped in cross section, and are spaced from one another sufficiently to permit the body part 53 of the switch arm 16 to move between them. One leg of the L-shaped stops 57 generally is parallel to but displaced from the face 22 for a distance corresponding to the length of the other leg. The legs parallel to the face 22 are designed to engage the cross member 52 of the switch arm 16 in a first position of the switch arm 16. In that first position, the contacts 61 and 34 of the member 44a and the contact means 32, respectively, are electrically connected to one another.

Figure 2:
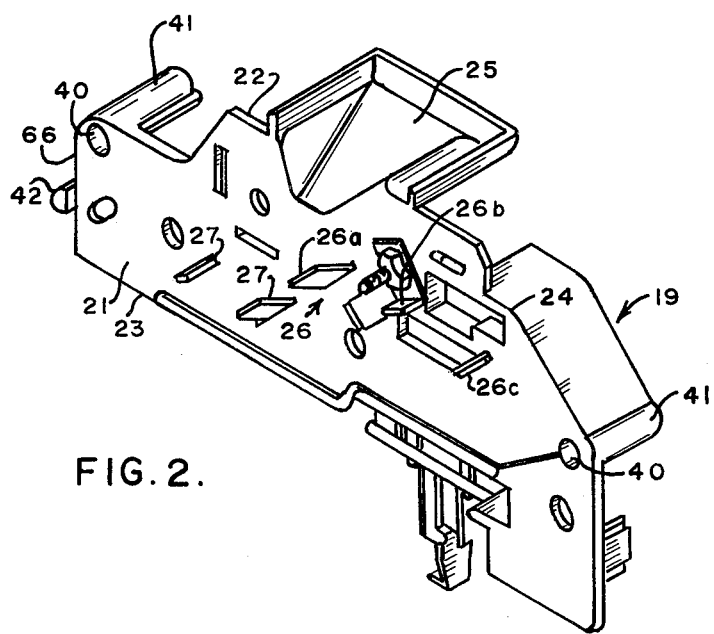
FIG. 2 is a view in perspective of a terminal board utilized in conjunction with the switch assembly of this invention.

Operation of the switch assembly 80 of this invention is relatively simple. In the off position of the motor 1, the collar 13 of the actuator 12 abuts the switch arm 16, forcing the switch arm leftwardly, referenced to FIGS. 1 and 2. The switch arm 16 pivots around the hooks 38 and the contacts 45 carried by the members 44b are permitted to engage the contacts 28 and 65 on the face 22 side of the terminal board 19, while the contacts 61 and 34 are disconnected. Conventionally, a power lead is connected to the terminal 26b so that electrical energy is transmitted through the terminal 26b, and the members 44b to a quick connect terminal 62 and 58, on the face 22 side of the terminal board 19.

Upon activation, the rotor 3 of the motor 1 starts to rotate, and as it increases speed, the collar 13 of the actuator 12 will move rightwardly, referenced to FIG. 1, as the centrifugal actuator elements expand radially outwardly. This movement disengages the collar 13 from the switch arm 16, and the switch arm moves rightwardly, referenced to FIGS. 1 and 2, until the cross members 52 engages the stops 60. This movement also enables the cross members 52 to lift the members 44b from electrical engagement with the contacts 28 and 65. Movement of the switch arm 16 is sufficient to enable the contact 61 carried by the member 44a to meet the contact 34, of the conductive means 32, thereby transferring electrical power from the terminals 62 and 58 to the terminal 33.

It may be observed, in FIG. 6, that whenever the cross member 52 abuts the stops 60, an end 59 of member 44a is spaced from the surface 51 of the switch arm 16 for a distance indicated by the numeral 63 in FIG. 6. Consequently, the actuator 12 is required to move the switch arm 16 for the distance 63 before operation of the switch assembly is affected. That is to say, the distance 63 provides a lost motion movement for the switch arm 16 in that the relationship of the stops 60 and the distance 63 are such that the switch arm 60 must move a distance greater than the distance 63 before operation of the switch assembly 80 is affected by that movement. Consequently, operation of the switch assembly 80 is not affected by misassembly of the actuator assembly or by face run out of the face 15 of the collar 13. In addition, the contact pressure between the contacts 61 and 34 are independent of actuator position. That is, because of the separation distance 63, pressure between the contacts 61 and 34 is dependent on the bias provided by the member 44a during construction of the conductive member 37. In like manner, the actuator 12 is positioned on the shaft 11 so that it drives the cross bar 52 clear of the members 44b in the off position of the motor 1, making the pressure between the contacts 45 carried by the members 44b, and the contacts 28 and 65 on the face 22 side of the terminal board 12 dependent on the bias provided by the members 44b, that bias being imparted to the members 44b during construction of the conductive means 37. Because the actuator 12 causes the switch arm 16 to over ride the contacts 45, 28 and 65, in the off position of the motor 1, there also is some lost motion movement that occurs during motor activation, as the switch arm 16 must move some predetermined distance before the cross bar 52 picks up the members 44b.

It thus may be observed that an economical and simple switch assembly is provided which may be mounted within the chamner 70 of the motor 1, so that access to the face 21 side of the terminal board 19 is easily available to field personnel, while the face 22 side of the terminal board 19 and the switch assembly 80 are relatively inaccessible.

Numerous variations, within the scope of the appended claims, will be apparent to those skilled in the art in light of the foregoing description and accompanying drawings. Thus, the design silhouette of the terminal board 19 may vary in other embodiments of this invention. Likewise, the number and location of quick connect terminals may be changed, depending upon applicational requirements. While the terminal board 19 was described as having lead guide means 25 associated with it, those skilled in the art will recognize that the lead guide means 25 may be eliminated or placed at other locations within the chamber 70, if desired. The terminal board and various portions of the switch assembly, with the exception of conductive means 37, preferably are constructed from a plastic material, permitting the terminal board to be molded in any desired design silhouette. However, other materials are compatible with the broader aspects of this invention. These variations are merely illustrative.

Having thus described the invention, what is claimed and desired to be secured by Letters Patent is:

1. A switch assembly including a terminal board for connecting a power source to said switch assembly, comprising:
   a first pair of electrical contacts mounted to said terminal board;
   a third electrical contact spacially displaced from said first pair of electrical contacts and mounted to said terminal board;
   a supporting block mounted to said terminal board;
   a conductive means mounted to said supporting block, said conductive means including a base portion, and a plurality of spaced, flexible conductive members extending outwardly from said base, the number of said conductive members equaling the total number of said electrical contacts, said conductive members being linearly arranged, two of said conductive members being bent so as to bias said conductive members toward engagement with said pair of first electrical contacts, and a third one of said conductive members being bent oppositely said other two conductive members so as to bias the third conductive member toward engagement with said third electrical contact; and
   a switch arm mounted for movement between at least a first position and a second position with respect to said terminal board, said switch arm adapted to engage the conductive members of said conductive means biased toward said pair of first electrical contacts while releasing said third conductive member as said switch arm moves in a first direction, and to engage the third conductive member while releasing the conductive member of said conductive means biased toward said pair of first electrical contacts as said switch arm moves in a second direction so that contact pressure between said conductive members and said electrical contacts in each of said first and said second positions is dependent upon the bias provided by the bend in respective ones of said contact member plurality.

2. The switch assembly of claim 1 including a coil compression spring, said coil compression spring being mounted between said terminal board and said switch arm.

3. The switch assembly of claim 2 wherein said switch arm is spaced from said third conductive member in the first position of said switch assembly so that a lost motion movement occurs prior to the engagement of said third conductive member by said switch arm, as said switch arm moves in said second direction.

4. A device for use with an actuator of dynamoelectric machine, comprising:
   a terminal board, said terminal board having a first face and a second face;

a support block mounted on the second face of said terminal board, said support block including means for attaching a switch arm to said terminal board, said attaching means being integrally formed with said terminal board;

a switch arm rotatably mounted for movement at said attaching means;

conductive means mounted to said support block, said conductive means including a base portion and at least a first conductive member and a second conductive member extending outwardly from said base portion;

a first plurality of electrical contacts operatively associated with said terminal board;

a second plurality of electrical contacts operatively associated with said first and said second conductive members, said first and said second contact plurality being arranged in sets of at least one each of said first and said second contacts aligned to permit abuttment with one another, movement of said switch arm in a first direction disconnecting at least a first set of said first and said second electrical contacts and connecting at least a second set of said first and said second electrical contacts, said switch arm being physically disengaged from operative interconnection with the connected set of the electrical contacts so that contact pressure between the electrical contacts is independent of any force applied by and to said switch arm.

5. The device of claim 4 further characterized by spring means biased between said terminal board and said switch arm for exerting a force on said switch arm.

6. The device of claim 5 wherein said first conductive member of said conductive means is biased in a first direction with respect to a plane defined by said base, and said second conductive member of said conductive means is biased in a second direction with respect to the plane defined by said base.

7. The device of claim 6 wherein said conductive means further includes a third conductive member biased in the same direction as said first conductive member.

8. The device of claim 7 wherein said switch arm includes a body part having a first end and a second end, said first end being T-shaped, said second end being free and adapted to abut said actuator in at least one position of said device, and a cross bar extending outwardly from said body part.

9. The device of claim 8 wherein said switch arm is movable between at least a first position and a second position, said switch arm engaging said second conductive member of said conductive means in said first position and being spaced from said second conductive member in said second position, said cross arm engaging said first and said third conductive members in said second position and being spaced from said first and said third conductive members in said first position.

10. The device of claim 9 wherein said switch arm attaching means comprises a pair of spaced, hooked-shaped members adapted to receive the T-shaped end of said switch arm.

11. In an electric motor having a stator assembly and a rotor assembly, said rotor assembly including a shaft, said stator assembly including a plurality of windings, the selective energization of said windings being utilized to generate a force for rotating said rotor assembly, and a centrifugal actuator mounted to said shaft including at least a part movable relative to said shaft, the improvement which comprises a terminal board for electrically interconnecting said windings to a source of power, said terminal board having a switch assembly attached to it, said switch assembly adapted to interconnect respective ones of said windings to a source of power, said switch assembly comprising conductive means, said conductive means including a base portion, a first conductive member extending outwardly from said base portion, a second conductive member extending outwardly from said base portion, and means responsive to part movement of said centrifugal actuator for alternately engaging and releasing said conductive members, said engaging and releasing means comprising a switch arm having a first end and a second end, said second end being adapted to abut said actuator in at least one position of said switch assembly, said switch arm having a non-conductive body part including means for alternately engaging and releasing said conductive members, release of said conductive members causing electrical energization of the released conductive member, the force applied to said conductive member during energization being independent of any force applied by and to said engaging and releasing means.

12. The improvement of claim 11 wherein said conductive means includes a third conductive member, said first and said third conductive members being positioned on opposite sides of said second conductive member, each of said conductive members having a first end attached to said base and a free second end, said second conductive member being biased from the plane of said base in a first direction, said first and said second conductive members being biased from the plane of said base in a direction opposite to that of said second conductive member.

13. The improvement of claim 12 further characterized by a spring biased between said terminal board and said switch arm.

14. The improvement of claim 13 wherein rotation of said switch arm defines at least a first position and a second position, said switch arm engaging said second conductive member in said first position and being spaced from said second conductive member in said second position, the cross bar engaging said first and said third conductive members in said second position and being spaced from said first and third conductive members in said first position.

15. The improvement of claim 14 wherein said terminal board has a pair of open mouth hooks integrally formed with it, said hooks being adapted to receive a first end of said switch arm.

* * * * *